(12) United States Patent
Pieczul et al.

(10) Patent No.: US 9,298,896 B2
(45) Date of Patent: Mar. 29, 2016

(54) SAFE AUTO-LOGIN LINKS IN NOTIFICATION EMAILS

(71) Applicant: International Business Machines Corporation, Armonk, NY (US)

(72) Inventors: Olgierd S. Pieczul, Dublin (IE); Mark A. McGloin, Dublin (IE); Mary E. Zurko, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 13/732,822

(22) Filed: Jan. 2, 2013

(65) Prior Publication Data

US 2014/0189820 A1    Jul. 3, 2014

(51) Int. Cl.
*G06F 21/31*    (2013.01)
*H04L 29/06*    (2006.01)
*H04L 29/08*    (2006.01)

(52) U.S. Cl.
CPC ............... *G06F 21/31* (2013.01); *H04L 63/08* (2013.01); *H04L 63/168* (2013.01); *H04L 67/02* (2013.01)

(58) Field of Classification Search
CPC ..... H04L 9/3247; H04L 63/08; H04L 63/168; H04L 67/02; G06F 21/31
USPC ........................................................ 726/5–9
See application file for complete search history.

(56) References Cited

U.S. PATENT DOCUMENTS

| | | | |
|---|---|---|---|
| 6,311,269 B2 * | 10/2001 | Luckenbaugh et al. | 713/154 |
| 6,510,464 B1 * | 1/2003 | Grantges et al. | 709/225 |
| 7,877,461 B1 * | 1/2011 | Rimmer | H04L 63/0823 709/203 |
| 7,954,144 B1 | 5/2011 | Ebrahimi et al. | |
| 2001/0037469 A1 * | 11/2001 | Gupta et al. | 713/202 |
| 2001/0045451 A1 * | 11/2001 | Tan | G06F 21/33 235/375 |
| 2002/0184485 A1 * | 12/2002 | Dray, Jr. | H04L 63/0442 713/150 |
| 2003/0061512 A1 * | 3/2003 | Flurry et al. | 713/201 |
| 2003/0105981 A1 * | 6/2003 | Miller et al. | 713/202 |
| 2003/0110399 A1 * | 6/2003 | Rail | 713/202 |
| 2003/0149880 A1 * | 8/2003 | Shamsaasef | H04L 63/062 713/182 |
| 2004/0030932 A1 * | 2/2004 | Juels et al. | 713/202 |
| 2004/0210771 A1 * | 10/2004 | Wood et al. | 713/201 |
| 2005/0074126 A1 * | 4/2005 | Stanko | 380/279 |
| 2007/0079382 A1 | 4/2007 | Celikkan et al. | |
| 2008/0026740 A1 * | 1/2008 | Netanel | G06Q 20/382 455/419 |
| 2008/0052775 A1 * | 2/2008 | Sandhu et al. | 726/14 |
| 2008/0082817 A1 * | 4/2008 | Takahashi et al. | 713/155 |

(Continued)

FOREIGN PATENT DOCUMENTS

EP    1 233 358    8/2002

*Primary Examiner* — Darren B Schwartz
(74) *Attorney, Agent, or Firm* — Jeffrey S. LaBaw; David H. Judson

(57) ABSTRACT

A web application user is authenticated directly upon selecting a link in a notification email. In this approach, the user's web browser stores a first data string provided by the web application (e.g., in a cookie) during a prior session. The first data string encodes first data about the user that can be verified by the application. Later, the user receives the notification email that includes the link. The link encodes a second data string from which second data about the user can be verified by the application. When the end user selects the link, an authentication request is transmitted to the application. The authentication request includes both the first and second data strings. If both the first data and the second data (as obtained from their respective data strings) can be verified, the user is authenticated without having to perform any additional steps (e.g., manual entry of credentials).

20 Claims, 3 Drawing Sheets

(56) References Cited

U.S. PATENT DOCUMENTS

| | | | |
|---|---|---|---|
| 2013/0117817 A1* | 5/2013 | Gantman et al. | 726/4 |
| 2013/0144755 A1* | 6/2013 | Mowatt | G06Q 30/06 705/26.41 |
| 2013/0318347 A1* | 11/2013 | Moffat | H04L 63/08 713/168 |
| 2014/0082715 A1* | 3/2014 | Grajek et al. | 726/8 |

* cited by examiner

SAFE AUTO-LOGIN LINKS IN NOTIFICATION EMAILS

BACKGROUND OF THE INVENTION

1. Technical Field

This disclosure relates generally to web application security and, in particular, to enabling a user to access the application using a link in a notification message but without requiring the user to re-enter login credentials.

2. Background of the Related Art

Many web applications send their users various notification messages (typically emails) from which the users can access the application by selecting a URL in the message. When a user receives the notification email having the embedded URL, he or she selects the embedded link, which opens the user's browser to a login page. At the page, the user is challenged to enter credentials to authenticate to the application. This approach, which requires the user to enter information manually, results in a poor user experience; also, it trains users to enter their credentials in response to links included in emails, an opportunity that is often exploited extensively in phishing attacks.

One solution to the problem of requiring users to manually login to the web application when they follow a notification email link is for the user to instruct the browser to remember some user credential; in this way, the credential does not have to be re-entered on each occasion when login is required. Another solution is for the application to offer a "remember me" option so that the user stays logged into the application (or is logged in automatically). These solutions provide some benefits, but only when the user accesses the application from the same web browser, which limits their usefulness. Yet another solution is to include URLs in notification emails that contain all of the data (e.g., a secret or signed parameter) that is required to authenticate the user. This approach, however, suffers from a serious security flaw because anyone who happens to have access to the notification email (e.g., because the user has forwarded it while being unaware of the consequences) may access the application on the user's behalf.

HTTP cookies (see IETF RFC6265) provide a way of managing sessions and state between web browsers and web servers using the HTTP protocol. In a typical browser-server interaction, a Web application sets a cookie, and the cookie is returned to the browser to present with subsequent requests until the cookie is expired by the web application. Web applications leverage cookies for security purposes, such as authentication, and session control.

BRIEF SUMMARY OF THE INVENTION

According to this disclosure, a web application user is authenticated directly upon selecting a link in a notification email. This approach works generally as follows. Initially, the user's web browser stores a first data string provided by the web application (e.g., in an HTTP cookie) during a prior authenticated session. The first data string encodes first data about the user that can be verified by the application. Later, the user receives the notification email that includes the link. The link encodes a second data string from which second data about the user can be verified by the application. When the end user selects the link, an authentication request is transmitted to the application. The authentication request includes both the first and second data strings. If both the first data and the second data (as obtained from their respective data strings) can be verified, the user is authenticated without having to perform any additional steps (e.g., manual entry of credentials).

One or both of the first data and the second data may be encoded in their respective data strings or otherwise secured through a cryptographic means, such as a digital signature. The first data and second data also may have a predetermined relationship, such as being "shares" of a secret according to a secret sharing scheme enforced by the web application (which itself may have a share of the secret). As noted above, both factors (the first data and the second data) must be verified in order for the automated authentication (from the notification link) to proceed successfully. Thus, when the end user selects the URL in the email message, an authentication request is transmitted to and received at the web application (or some proxy). As noted above, preferably the authentication request includes both the first data string and the second data string. A determination is then made, typically by the web application, regarding whether the first data and the second data (derived from their respective data strings) can be obtained and verified. If both the first data and the second data can be verified, the user is authenticated without having to perform any additional steps (such as manual entry of user credentials). If, however, either one or both of the first data and second data cannot be verified, a login page is presented to facilitate the authentication. In this way, the user may be authenticated from the notification email directly (in a single click operation), but in a safe and secure manner.

The foregoing has outlined some of the more pertinent features of the invention. These features should be construed to be merely illustrative. Many other beneficial results are attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
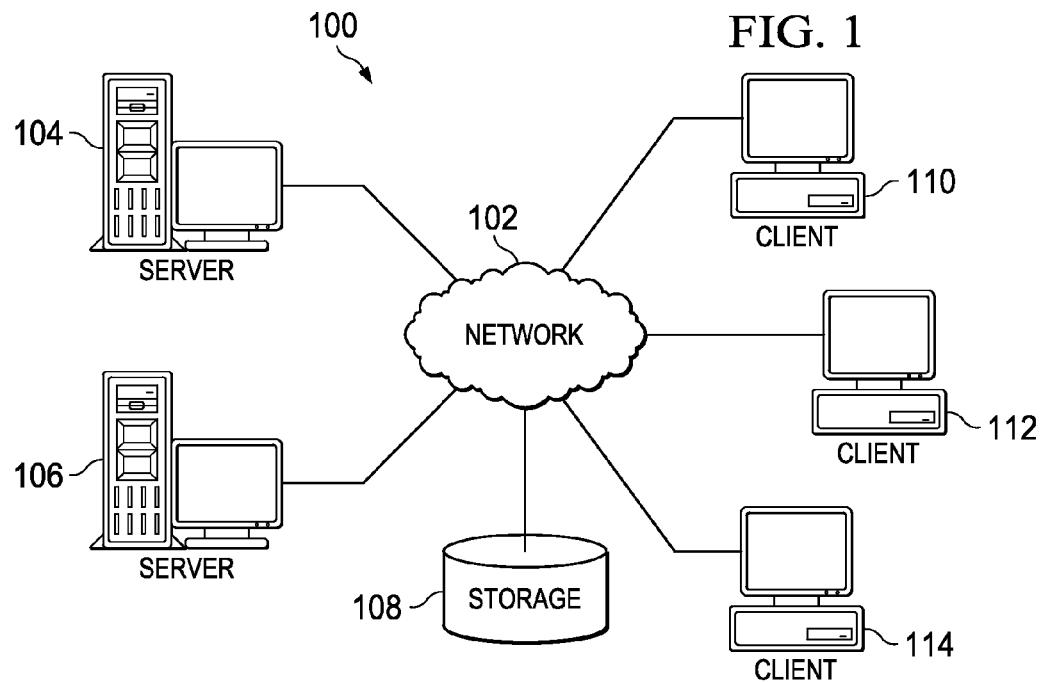
FIG. 1 depicts an exemplary block diagram of a distributed data processing environment in which exemplary aspects of the illustrative embodiments may be implemented.
Figure 2:
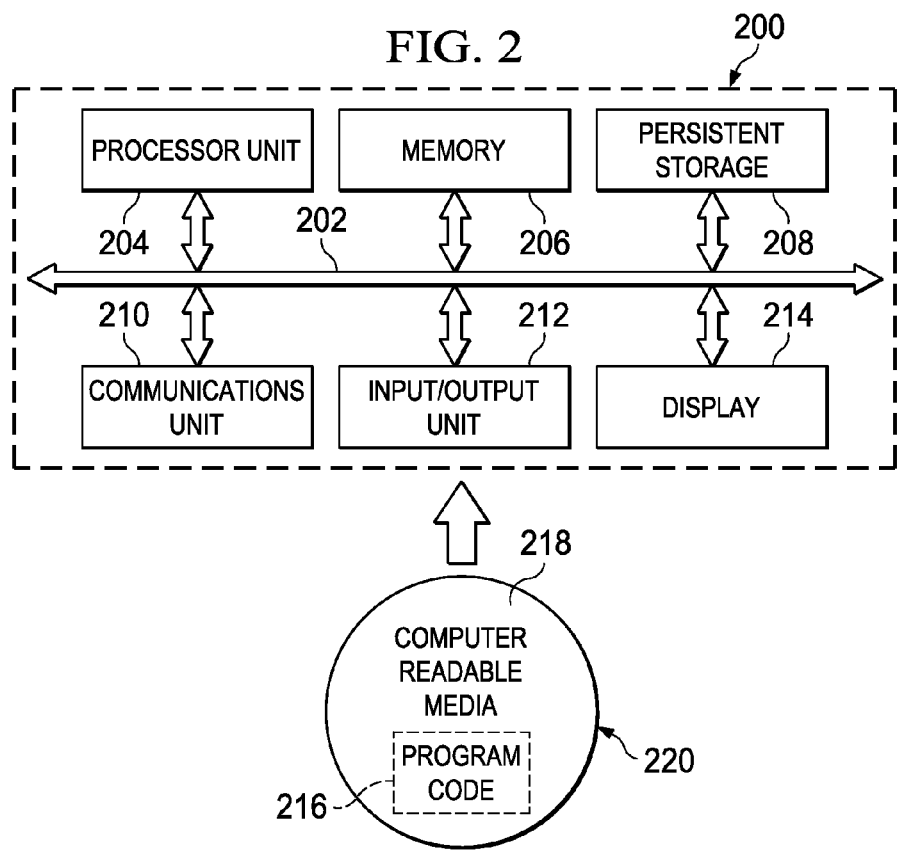
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C or the like, and conventional procedural programming languages, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. An authentication credential is differentiated from an authentication assertion: an authentication credential is presented by a user as part of an authentication protocol sequence with an authentication server or service, and an authentication assertion is a statement about the successful presentation and validation of a user's authentication credentials, subsequently transferred between entities when necessary.

HTTP cookies (see IETF RFC6265) provide a way of managing sessions and state between web browsers and web servers using the HTTP protocol. In a typical browser-server interaction, a Web application sets a cookie, and the cookie is returned to the browser to present with subsequent requests until the cookie is expired by the web application. Web applications leverage cookies for security purposes, such as authentication, and session control. An HTTP cookie typically comprises a set of name-value pairs. It may be "persistent" in the sense that it is received and stored in a browser cache for an indefinite time period.

Figure 3:
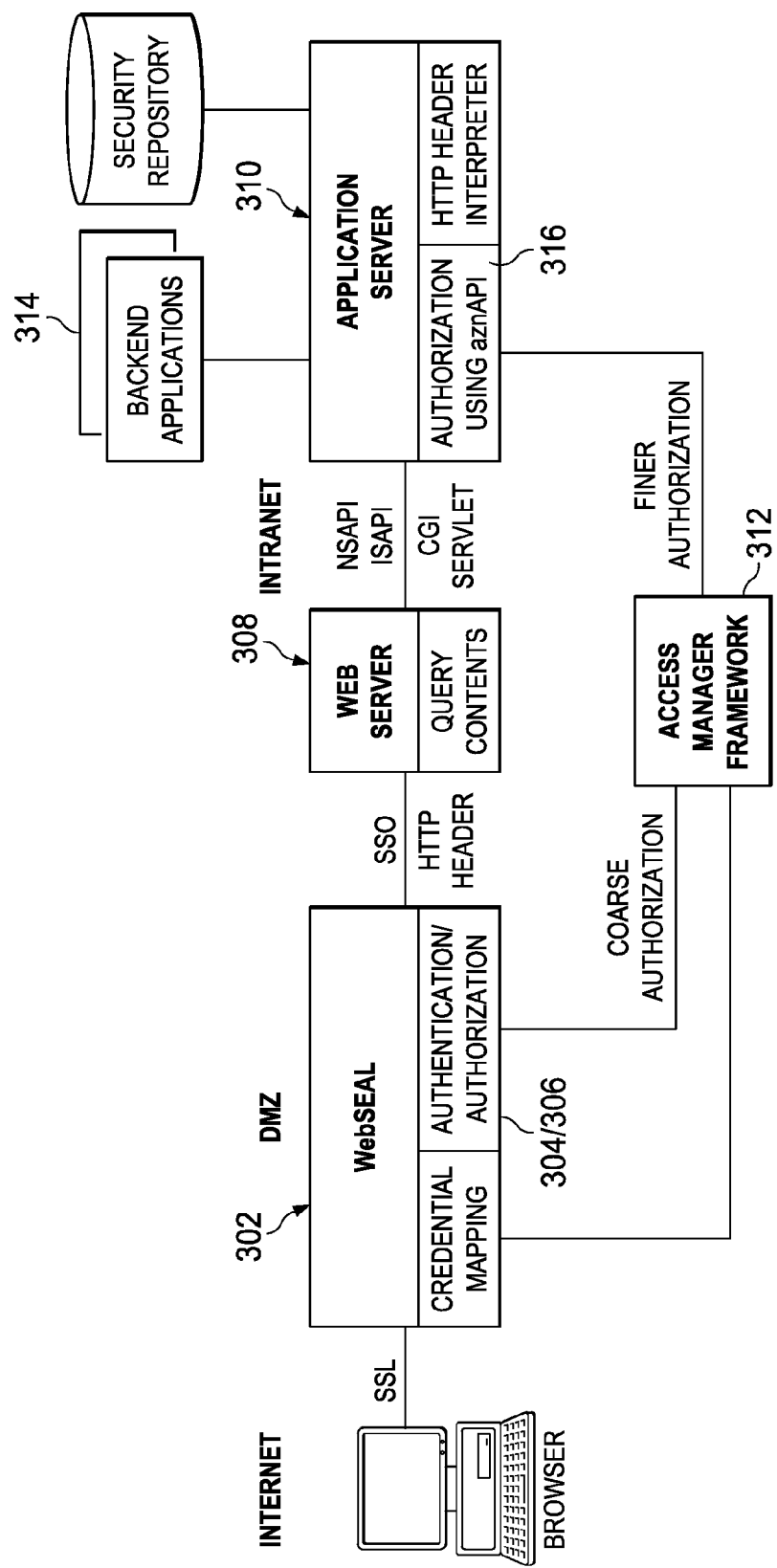
FIG. 3 illustrates a known Web portal having an access management framework in which the subject disclosure may be implemented.

As will also be described, the technique that is the subject of this disclosure also may be implemented in a system that includes a session management component. Session management typically is provided in association with an access manager, which is a component that prevents unauthorized use of resources, including the prevention of use of a given resource in an unauthorized manner. A representative access manager is the Tivoli® Access Manager for e-business (TAMeb) product, which is available commercially from IBM, and is represented in FIG. 3. Of course, the identification of this commercial product is not meant to be taken to limit the present invention. More broadly, any system, device, program or process that provides a policy/access/service decision may be used for this purpose. A representative but non-limiting implementation is a point of contact (PoC) that acts as an intermediary between a client browser and one or more back end applications. The point of contact is a reverse proxy, a Web server plug-in, or the like, that is executed in at least one processor. As described above, this component is responsible for the session management of users.

FIG. 3 illustrates how TAM is integrated in a Web portal to provide authorization and access control services for Web resources. A high performance, multi-threaded Web server 302 (called WebSEAL in the figure), a TAM component, manages access to all Web servers (such as Web server 308), regardless of their platforms. This allows the enterprise to centrally control their Web resources as a single, logical Web space. When users first enter a portal, they are prompted to provide authentication information that allows the portal to verify the identity of the user. Authentication typically is based around user name and password. An authentication function 304 provides this function. Authorization determines what resources an authenticated client can use. An authorization function 306 provides this function. The Web server component 302 also provides a single sign-on, coarse-grained access control (namely, whether one can access the Web server 308 or not), high availability, and scalability. As shown in FIG. 3, the access manager also enables access control for individual objects on the Web server 308 or application server 310. Preferably, the access manager framework 312 handles access control for static content and dynamic content. The information passed from WebSEAL can also be used to access back end applications 314. In addition, for more fine-level authorization control, the access manager implements aznAPI 316, which allows an application to call out to an authorization service for authorization decisions. Information passed from WebSEAL and obtained from the access manager framework 312 can be used to make access decisions to back end applications.

TAM is just one example of a generic authentication framework. Generalizing, a typical framework of this type provides a reverse proxy, web plug-in or the like that provides session management functionality and that includes authorization functionality as part of this session management. The framework collects a user's authentication credentials, evaluates them, and establishes a session, including some form of session management functionality (such as a session cookie). To provide a user with the advantages of this consolidated environment, the framework then provides a single sign-on solution for the user by asserting authentication credentials (such as username/password) to the back-end applications. This allows the back-end application to be added to the portal environment without modification.

Safe Auto-Login in Notification Messages with Two Factor Authentication

According to this disclosure, a web application user is authenticated directly upon selecting a link in a notification email. This approach works generally as follows. Initially, the user's web browser stores a first data string provided by the web application (e.g., in an HTTP cookie) during a prior session. The first data string encodes first data about the user that can be verified by the application. Later, the user receives the notification email that includes the link. The link encodes a second data string from which second data about the user can be verified by the application. When the end user selects the link, an authentication request is transmitted to the application. The authentication request includes both the first and second data strings. If both the first data and the second data (as obtained from their respective data strings) can be verified, the user is authenticated without having to perform any additional steps (e.g., manual entry of credentials).

Figure 4:
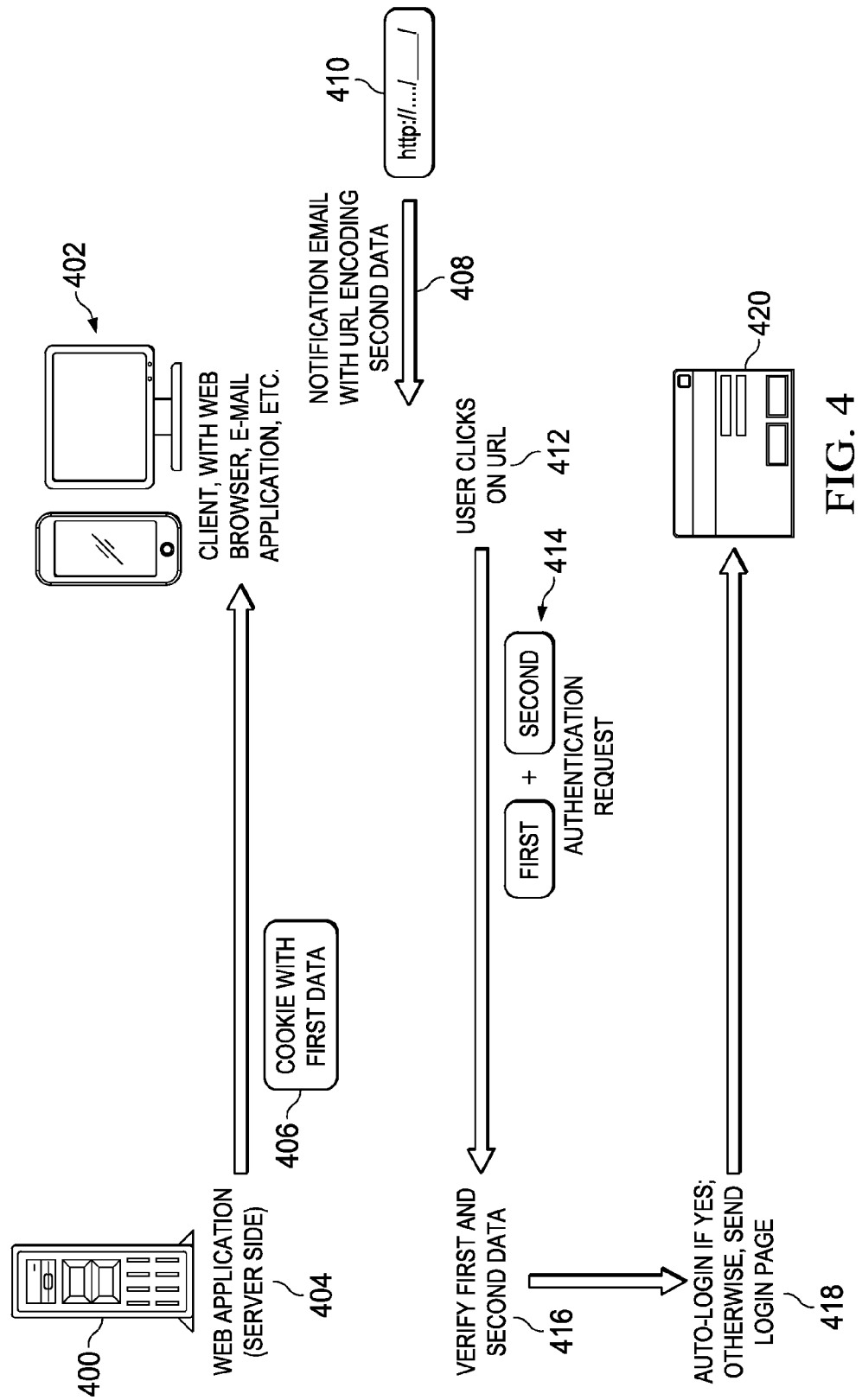
FIG. 4 is a simplified block diagram of a web browser interacting with a backend application through a reverse proxy that stores cookies in a session cache or "cookie jar" as is known in the prior art.

FIG. 4 illustrates this operation for a basic client-server embodiment, such as shown in FIG. 1. The technique may also be practiced in the web portal embodiment shown in FIG. 3, although this is not a limitation. As shown in FIG. 4, a web application executes in the server 400, and the client 402 (e.g., a mobile device, a desktop, a laptop, a tablet, or the like) has the usual applications such as a web browser, an e-mail application, and the like. The client is a computing entity such as shown in FIG. 2. While HTTP client-server-based interactions are shown, this is not a limitation, as the technique may be implemented in other types of client-server embodiments.

Thus, for example, the technique may be a "rich" client; a rich client is a client (of a client-server application) that supports its own interface (as opposed to merely exporting the web interface from the web application itself). A "rich" client typically is not browser-based, and it is sometimes referred to as a "thick" (as compared to a browser-based or "thin") client. Client-server interactions also need not be HTTP-based. At step 404, the web application provides the client a cookie 406 that encodes first data about the user and that can be verified by the web application. Typically, step 404 occurs in association with a first user transaction or session, and that transaction/session may take place at any time. The cookie is received and stored in the web browser (typically in a cookie cache) in the usual manner. The cookie 406 may be a persistent cookie, or it may have time expiry (in which case the cookie "expires" after that time period). The cookie may be a one-time cookie, in which case it may be only used (returned to the web application for validation) on one and only one occasion.

Although not meant to be limited, the "first data" about the user is encoded in the cookie in the form of a "first data string." The first data may be quite varied, but typically includes data (e.g., user name, user identifier, other personally identifiable information (PII), or the like) that the application is able to verify but that is not necessarily known or knowable to a third party. The nature of the encoding may also be quite varied and may include, for example, a digital signature of the first data. In a representative embodiment, the first data string comprises the first data and its digital signature, perhaps encrypted (e.g., with a key of a public key cryptosystem). Any type of encoding may be applied to the first data.

As also illustrated in FIG. 4, at some point-in-time, the client receives a notification message 410. This is step 408. The notification message may or may not originate from the web application. In FIG. 4, the notification message 410 originates from a source other than the web application. In this example, the notification message is an email, and the email includes an embedded URL. Alternatively, the notification message may be a text message (SMS), or in some other format that includes a link. According to this disclosure, the link encodes second data about the user that, like the first data, is known to and can be verified by the web application. Preferably, the second data differs from the first data, but this is not a requirement. The second data is encoded in the link in the form of a second data string. Like the first data string, the second data string may be formed of the second data and its digital signature.

Steps 404 and 408 typically occur at different times. Typically, step 404 (receipt of the cookie) occurs before step 408 (receipt of the notification message), but this is not a requirement. Step 408 may precede step 404. Moreover, steps 404 and 408 may occur at or near the same point-in-time. As also noted above, the cookie and e-mail typically originate from different sources, although the cookie will originate from the web application (or its proxy).

At step 412, it is assumed that the user has selected the link in the notification message. According to this disclosure, it is desired that, if possible (and safe to do so), the user is then authenticated to the web application automatically upon such selection. The user is automatically authenticated if he or she does not then have perform an additional operation (e.g., enter user id and password, present some biometric for screening, etc.) upon clicking the link in the notification message. This auto-login operation is achieved as follows. At step 414, and following the user's selection of the link, the client application (e.g., the, browser, the e-mail client, or the like) from which the link was activated sends an authentication request 414 to the web application. The authentication request comprises both the first data string, which was received in the cookie 406 at step 404, and the second data string, which was received in the notification message 410 at step 408.

At step 416, the web application determines, without additional user input, whether the first data and the second data can be verified. The verification step 416 typically involves obtaining the first data from the first data string, and obtaining the second data from the second data string, and then determining whether those data strings can be verified. Depending on the nature of the encoding involved, the verification step also may involve one or more other operations such as decryption, signature verification, secret generation and verification, time expiry verification, and the like (or combinations thereof). If the first and second data are verified, the user is logged into the web application automatically. If, however, either the first and second data cannot be verified by the web application, the web application serves the client a login page 420 to request login. This completes the process.

Generalizing, the first data is a first factor, and the second data is a second factor. Thus, the approach as described above implements auto-login from a notification email with two (2) factor authentication.

The first data and the second data may be related to each other. Thus, for example, the first data and the second data may each be pieces of a single secret according to a secret sharing scheme. Secret sharing is a known method for distributed a secret among a group of participants, each of whom receives a share of the secret. The secret is reconstructed only when a sufficient number of shares are combined together. The individual shares typically are of no use on their own in reconstructing the secret. In this context, the secret may comprise the first data and the second data (each being individual shares), or the secret may comprise yet another share, which would be held by the web application itself. In the latter case, all three shares would need to be combined to re-generate the secret.

The first data or the second data may be other than actual user information; indeed, neither the first data nor the second data needs to contain any information about the user or even items specific to the user or the user's environment, as server-side association or mapping to the user identity can be performed as needed. Thus, the first data or the second data may constitute non-user-specific information about the client computing entity itself such as, without limitation, IP address, MAC address, operating system, browser instance, or the like. Other types of information may be used as well. Such information, however, must still be known to and capable of being verified by the web application but not easily produced by a third party that might be seeking to obtain authentication.

One or both of the first data string (the first factor) and the second data string (the second factor) may have an expiry time associated therewith. When the data strings are generated using digital signature schemes, the expiry time may be simply concatenated with the user information and signed together. The expiry times for each factor may be the same or different. In one embodiment, the expiry time for the cookie (the first factor) may be updated on each user login.

In one embodiment, which is highly secure, the first data string is formed as follows. In particular, the first data and second data are each shares of a secret sharing scheme wherein the web application holds third data; the first, second and third data collectively comprise a secret. In this scheme, the first data (from the cookie) also has an associated time expiry (in the form of a timestamp), and the first data and the time expiry are signed, with the result being further secured by a public key of a public-secret key pair. The secret key is known only to the web application. When the web application receives the authentication request comprising the first data string (and the second data string), it first applies the private key to remove the encryption layer. The web application then verifies the digital signature to obtain the first data and the timestamp. The web application then checks the timestamp to determine whether the first data should even be evaluated. If the timestamp indicates that the first data is not stale, the web application re-generates the secret (by combining the shares) and checks to see whether the resulting secret is valid for this user. If so, then the user is considered to be authenticated and access to the web application permitted (automatically). Of course, the above example should not be taken to limit the verification step but, rather, is only described as one approach that may be implemented. As noted, the nature of the verification will depend on the types of encoding used to generate the first data string and the second data string, as well as the degree of security desired to be imposed.

The described technique provides significant advantages. It enables auto-login from a notification message securely. The technique provides a useful compromise approach between a "remember me" type of option and automatic login links sent in the notifications. It allows quick access to the web application but does not have the drawbacks of both solutions. In particular, it allows for the sending of auto-login URLs safely and securely, and without the attendant risks of known approaches.

The functionality described above may be implemented as a standalone approach, e.g., a software-based function executed by a processor, or portions of it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, JSON, REST, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As noted above, the scheme described herein may be implemented in or in conjunction with various server-side architectures including simple n-tier architectures, web portals, federated systems, and the like. The proxy may be located in a domain that differs from the domain of one or more back-end applications and, thus, the techniques herein may be practiced in a loosely-coupled server (including a "cloud"-based) environment. The proxy itself may be hosted in the cloud, in which case it can provide single sign-on to applications running in a third party environment as well as the single sign-off functionality described herein.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the auto login from a notification message can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the cookie generating, storing and authentication request processing components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises a dynamic web session clean-up framework that provides single sign-off in a client or proxy, as has been described above.

The function may be implemented as an adjunct or extension to an existing access manager or policy management solution.

The approach is not limited on the server-side to a web application. Any server application may be used.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. Further, while typically the client-server interactions occur using HTTP, this is not a limitation either. The client server interaction may be formatted to conform to the Simple Object Access Protocol (SOAP) or JavaScript Object Notation (JSON) and travel over HTTP (over the public Internet), FTP, or any other reliable transport mechanism (such as IBM® MQSeries® technologies and CORBA, for transport over an enterprise intranet) may be used. Also, the term "web site" or "service provider" should be broadly construed to cover a web site (a set of linked web pages), a domain at a given web site or server, a trust domain associated with a server or set of servers, or the like. A "service provider domain" may include a web site or a portion of a web site. Any application or functionality described herein may be implemented as native code, by providing hooks into another application, by facilitating use of the mechanism as a plug-in, by linking to the mechanism, and the like.

The techniques disclosed herein are not limited to a Web-based portal having a point of contact that provides authentication, session management and authorization, but this will be a typical implementation. As noted, the above-described function may be used in any system, device, portal, site, or the like wherein server-set session management data might be re-used (either by an original user in a different session, or by another user) through the same client browser. More generally, the described technique is designed for use in any operating environment wherein given information (including, without limitation, session management data) is not intended to persist across applications or sessions but ends up doing so because of patterns of client re-use and/or application-level granularity of session information.

The term "cookie" should be broadly construed to refer to an HTTP cookie (RFC 2109) or, more generally, any data structure that includes session-specific data associated with the server-side instance that returns that data structure.

In the client-side embodiment, the functionality may be implemented using AJAX or other client-side technologies.

Having described our invention, what we now claim is as follows:

1. A method to authenticate a user of an application executing on a computing machine from a notification message that includes a resource locator, comprising:
   providing a first data string from which first data about the user can be obtained and verified by the application, the first data string including the first data and its digital signature;
   providing the notification message that includes the resource locator, the resource locator including a second data string from which second data about the user can be obtained and verified by the application, wherein the first data and the second data are each shares of a secret defined by a secret sharing scheme;

receiving, as an authentication request and as a result of the user having selected the resource locator in the notification message, the first data string and the second data string; and determining, without additional user input, whether the first data and the second data can be verified, wherein a determination regarding the first data includes verifying the digital signature;

when the first data and the second data are verified, authenticating the user to the application executing on the computing machine.

2. The method as described in claim 1 wherein the first data string includes an HTTP cookie and is provided to a user agent associated with the user at a first time.

3. The method as described in claim 2 wherein the notification message is an email that is provided to the user at a second time.

4. The method as described in claim 1 further including:
providing a login page to request a user credential when either the first data or the second data cannot be verified.

5. The method as described in claim 1 wherein the secret defined by the secret sharing scheme also includes third data held by the application.

6. The method as described in claim 1 wherein the first data string is encrypted with a public key of a public key cryptosystem that includes a private key held by the application, wherein the determination regarding the first data also includes applying the private key.

7. The method as described in claim 1 wherein at least one of the respective first and second data have an expiry time associated therewith.

8. Apparatus, comprising:
a processor;
a data store;
non-transitory computer memory holding computer program instructions executed by the processor to authenticate a user of an application executing on a computing machine from a notification message that includes a resource locator by:
providing a first data string from which first data about the user can be obtained and verified by the application, the first data string including the first data and its digital signature;
providing the notification message that includes the resource locator, the resource locator including a second data string from which second data about the user can be obtained and verified by the application, wherein the first data and the second data are each shares of a secret defined by a secret sharing scheme;
receiving, as an authentication request and as a result of the user having selected the resource locator in the notification message, the first data string and the second data string; and
determining, without additional user input, whether the first data and the second data can be verified, wherein a determination regarding the first data includes verifying the digital signature;
when the first data and the second data are verified, authenticating the user to the application executing on the computing machine.

9. The apparatus as described in claim 8 wherein the first data string includes an HTTP cookie and is provided to a user agent associated with the user at a first time.

10. The apparatus as described in claim 9 wherein the notification message is an email that is provided to the user at a second time.

11. The apparatus as described in claim 8 wherein the method further includes:
providing a login page to request a user credential when either the first data or the second data cannot be verified.

12. The apparatus as described in claim 8 wherein the secret defined by the secret sharing scheme also includes third data held by the application.

13. The apparatus as described in claim 8 wherein the first data string is encrypted with a public key of a public key cryptosystem that includes a private key held by the application, wherein the determination regarding the first data also includes applying the private key.

14. The apparatus as described in claim 8 wherein at least one of the respective first and second data have an expiry time associated therewith.

15. A computer program product in a non-transitory computer readable storage medium for use in a data processing system, the computer program product holding computer program instructions which, when executed by the data processing system, perform a method to authenticate a user of an application executing on a computing machine from a notification message that includes a resource locator, the method comprising:
providing a first data string from which first data about the user can be obtained and verified by the application, the first data string including the first data and its digital signature;
providing the notification message that includes the resource locator, the resource locator including a second data string from which second data about the user can be obtained and verified by the application, wherein the first data and the second data are each shares of a secret defined by a secret sharing scheme;
receiving, as an authentication request and as a result of the user having selected the resource locator in the notification message, the first data string and the second data string; and
determining, without additional user input, whether the first data and the second data can be verified, wherein a determination regarding the first data includes verifying the digital signature;
when the first data and the second data are verified, authenticating the user to the application executing on the computing machine.

16. The computer program product as described in claim 15 wherein the first data string includes an HTTP cookie and is provided to a user agent associated with the user at a first time.

17. The computer program product as described in claim 16 wherein the notification message is an email that is provided to the user at a second time.

18. The computer program product as described in claim 15 wherein the method further includes:
providing a login page to request a user credential when either the first data or the second data cannot be verified.

19. The computer program product as described in claim 15 wherein the secret defined by the secret sharing scheme also includes third data held by the application.

20. The computer program product as described in claim 15 wherein the first data string is encrypted with a public key of a public key cryptosystem that includes a private key held by the application, wherein the determination regarding the first data also includes applying the private key.

* * * * *